United States Patent [19]

Allen et al.

[11] 4,032,171
[45] June 28, 1977

[54] TRAILER HITCH LOCKING DEVICE

[76] Inventors: Cloy L. Allen, P.O. Box 224, Wingate, Tex. 79566; Bobby L. Hook, 1207 S. 6, Merkel, Tex. 79536

[22] Filed: May 17, 1976

[21] Appl. No.: 687,279

[52] U.S. Cl. .............................................. 280/507
[51] Int. Cl.² ........................................... B60D 1/06
[58] Field of Search ............................. 280/507, 511

[56] References Cited

UNITED STATES PATENTS

| | | | |
|---|---|---|---|
| 3,522,958 | 8/1970 | Lusignan | 280/507 |
| 3,605,457 | 9/1971 | Foster | 280/507 |
| 3,866,949 | 2/1975 | Green | 280/507 |

*Primary Examiner*—Robert R. Song
*Attorney, Agent, or Firm*—Robert K. Rhea

[57] ABSTRACT

A theft deterrent trailer hitch lock to obstruct removal of the socket portion of a trailer hitch from engagement with a trailer hitch ball mounted on a tow bar secured to a towing vehicle. The device includes a right angular-shaped base having a first flange underlying the hitch ball and bolted to the tow bar by bolts having an upstanding end portion projecting above the upper limit and on opposing sides of the trailer hitch socket portion. The upstanding flange of the angle base is pivotally connected with a top member vertically movable toward and away from the upper limit of the trailer hitch socket portion and having apertures therein receiving the upper ends of the base flange bolts. A lockable bar, slidably supported by the top member along its edge opposite the pivotal connection, is provided with an aperture mating with an aperture in the top member for receiving the bolt of a lock.

6 Claims, 6 Drawing Figures

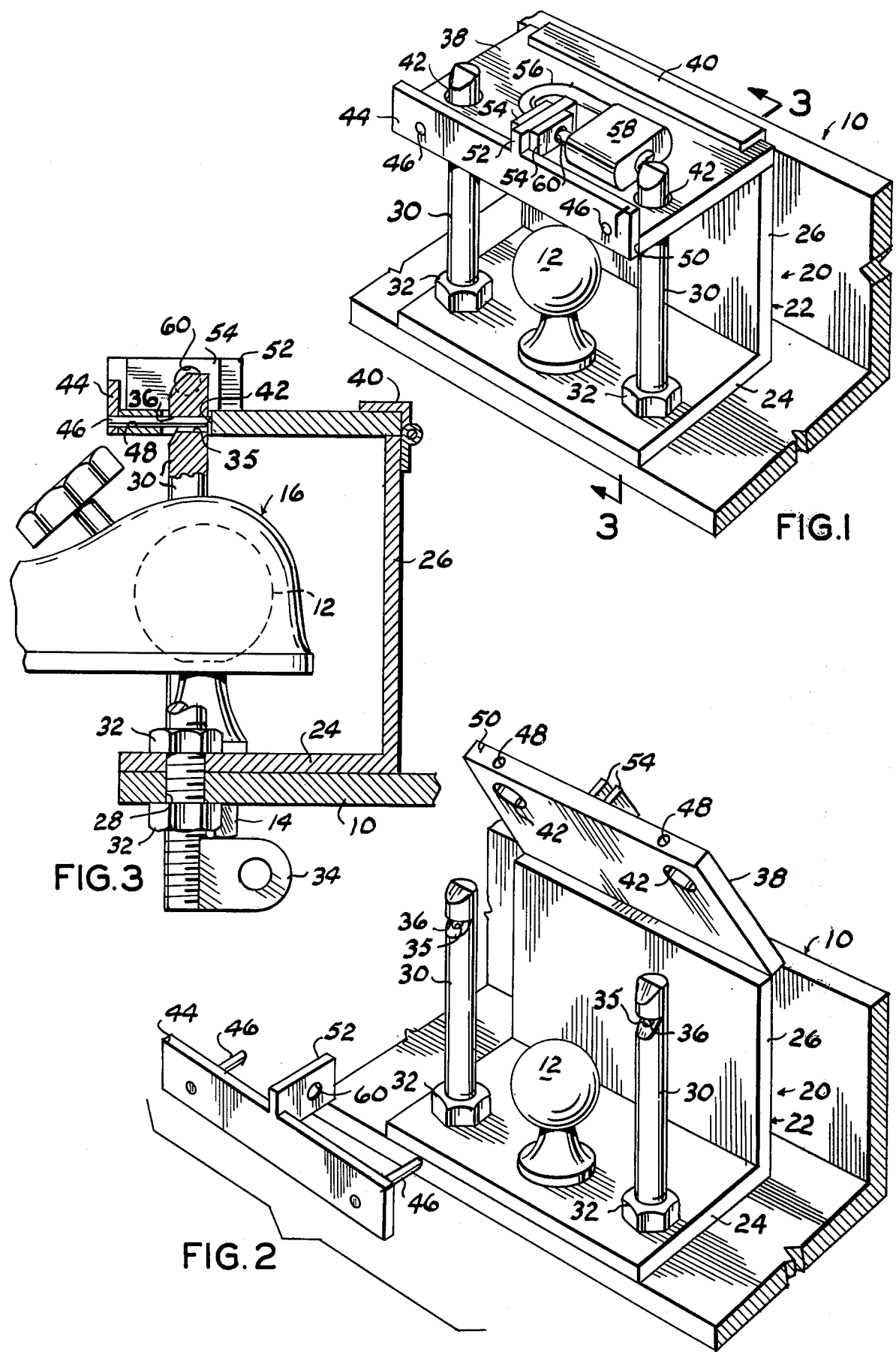

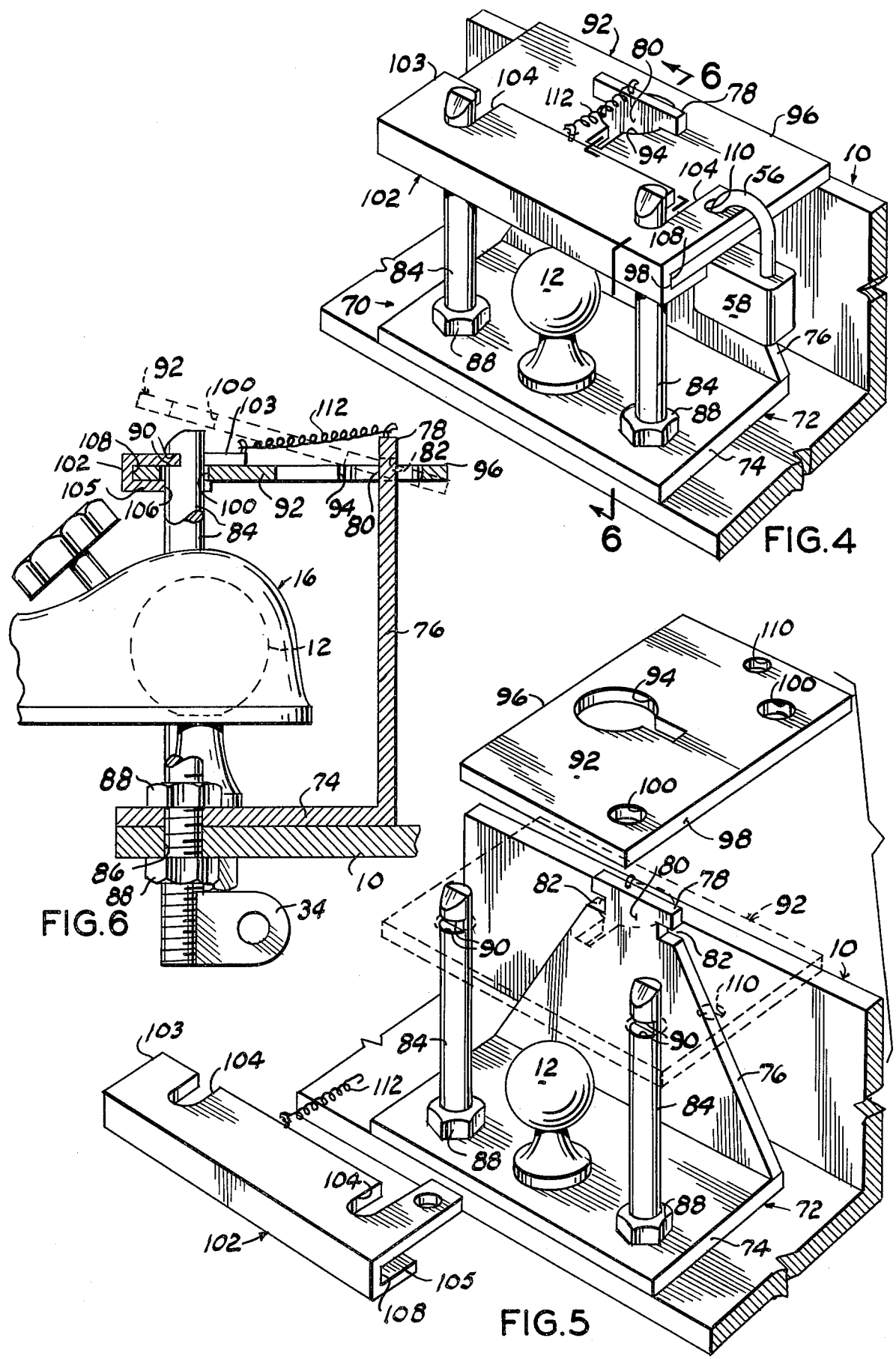

TRAILER HITCH LOCKING DEVICE

BACKGROUND OF THE INVENTION

1. Field of the Invention.

The present invention relates to trailer hitches and more particularly to a trailer hitch of the ball and socket type including lockable members preventing accidental or unauthorized separation of the trailer hitch socket from the hitch ball.

The common and well known means for attaching trailers to towing vehicles comprises a ball secured to the towing bar of the towing vehicle with the ball being received by a trailer hitch socket mounted on the forward end of the trailer tongue. The ball is normally held in the socket by retractable members engaging the lower half surfaces of the ball to prevent separation of the socket and ball until the socket is manually released. Vibration, while traveling, sometimes loosens the trailer hitch socket and permits separation of the socket from the ball thus, as a safety feature, a flexible member, such as a chain, is usually employed for connecting the trailer to the towing vehicle in the event of accidental separation of the trailer hitch components. It is not uncommon for an unauthorized person to disconnect the trailer hitch socket from the trailer hitch ball of unattended parked vehicles and connect the trailer to another vehicle and depart.

This invention provides an apparatus which prevents accidental separation of a trailer hitch socket from a ball while traveling and more importantly acts as a theft deterrent by locking the trailer hitch socket to the ball.

2. Description of the Prior art.

Trailer hitch locking devices, as shown by the prior art, have generally comprised bolt or strap-like devices overlying the trailer hitch socket, such as U.S. Pat. Nos. 2,571,349; 3,237, 969; 3,391,555 and 3,884,055. The principal objection to this type of trailer hitch locking device is that the use of a bolt cutter or hacksaw severing a single bolt or strap metal member releases the locking device.

This invention provides a locking device which is not easily thwarted by the user of a bolt cutter, hacksaw, or the like, principally by the mass of the material forming the components of the device.

SUMMARY OF THE INVENTION

A right angular base member has a first flange flatly disposed longitudinally on the tow bar of a towing vehicle and secured thereto by a pair of bolts disposed on opposing sides of the conventional trailer hitch ball having its threaded stem projecting through the base member and tow bar. The other or upstanding flange of the base member is disposed forwardly toward the towing vehicle in spaced relation with respect to the hitch ball to permit free pivoting movement of the trailer hitch socket when connected with the ball. A top member is pivotally connected by one edge portion with the upper limit of the upstanding base flange for vertical pivoting movement toward and away from the base first flange in overlying relation with respect to the trailer hitch socket. The top member is provided with a pair of apertures slidably receiving the upper end portions of the pair of bolts. A lockable bar is slidably supported by the top member along its edge opposite its pivotal connection. The lock bar is provided with a lock bolt receiving aperture mating with an aperture formed in the top member when the lockable bar is engaged within a cooperating recess formed in the upper end portion of the respective upstanding bolt.

The principal object of the invention is to provide a theft deterrent locking device for securing trailer hitch components in connected relation.

BRIEF DESCRIPTION OF THE DRAWINGS

FIG. 1 is a perspective view of one embodiment of the device connected with a fragment of a towing bar;

FIG. 2 is a view similar to FIG. 1 illustrating the locking device is partially exploded unlocked position;

FIG. 3 is a vertical cross sectional view, partially in elevation, taken substantially along the line 3—3 of FIG. 1, illustrating the relative position of a trailer hitch socket when connected with the ball;

FIG. 4 is a perspective view similar to FIG. 1 illustrating another embodiment of the device;

FIG. 5 is a view similar to FIG. 4 illustrating the components of FIG. 4 partially in exploded unlocked position; and, FIG. 6 is a vertical cross sectional view, partially in elevation, taken substantially along the line 6—6 of FIG. 4.

DESCRIPTION OF THE PREFERRED EMBODIMENTS

Like characters of reference designate like parts in those figures of the drawings in which they occur.

In the drawings:

Referring more particularly to FIGS. 1, 2 and 3, the reference numeral 10 indicates the medial portion of a tow bar, such as a bumper, transversely connected to the rearward end of a towing vehicle, such as a pickup truck, or the like, not shown. The tow bar 10 is provided with a vertical aperture which receives the threaded shank, not shown, of a trailer hitch ball 12. A nut 14 secures the ball 12 to the tow bar. A trailer hitch socket member 16, connected with the tongue or forward end portion of a vehicle to be towed, not shown, cooperatively engages the ball 12 to complete a trailer hitch connection. The above description is conventional with trailer hitch components connected respectively with towing and towed vehicles and is set forth to show the combination with which the invention is intended to be used.

The reference numeral 20 indicates the trailer hitch locking device, as a whole, which is substantially rectangular box-like in general configuration. The device 20 comprises an elongated right angular support base 22 having a first flange 24 flatly disposed longitudinally on the upper surface of the tow bar 10 and provided with an aperture cooperatively receiving the shank of the hitch ball 12. The other upstanding flange 26 of the base is substantially coextensive with the height of the bolts 30 and is disposed toward the towing vehicle forwardly of the position of the ball 12. The base flange 24 and tow bar 10 are vertically line drilled, as at 28, in spaced-apart relation on opposing sides of the ball 12 for receiving the depending end of a pair of rods or bolts 30 having threads at their depending ends for receiving nuts 32 and adjustably securing the bolts to the base and tow bar. An apertured lug 34 is welded to the depending end of at least one of the bolts 30 for connection with a safety chain, not shown, connecting the towed vehicle to the towing vehicle and preventing unauthorized removal of the bolts 30. Adjacent their upper ends the bolts 30 are provided with a rearwardly facing recess or notch and transverse bore 35 forming a downwardly facing horizontal shoulder 36 for the purposes presently explained.

A plate-like top member 38 is hingedly connected to the upper limit of the vertical flange 26 by a strap hinge 40, or the like, for vertical pivoting movement of the top member about a horizontal axis toward and away from the base flange 24. The top member is provided with a pair of apertures 42 for cooperative reception of the upper end portion of the bolts 30.

A lockable bar 44 is provided with a pair of parallel mandrels 46 cooperatively received by a pair of apertures 48 formed in the rearward edge surface 50 of the top member in aligned relation with respect to the bolts 30 and communicating with the top member bolt receiving apertures 42. The purpose of the mandrels 46 is to lockingly engage the horizontal shoulders 36 and enter the bolt bores 35 to prevent unauthorized upward movement of the top member 38 in a trailer hitch socket releasing action. The lockable bar 44 is centrally provided with a vertically disposed fin 52 overlying the top member 38 and projecting toward the hinge 40 for cooperative reception between spaced-apart parallel upstanding lugs 54 secured to the upper surface of the top member. The upstanding lugs 54 and fin 52 are transversely line drilled for receiving the bolt 56 of a lock 58.

In the operation of the embodiment shown in FIGS. 1 to 3, with the lock 58 and locking bar 44 removed, the top member is pivoted toward its position in FIG. 2 and the trailer hitch socket 16 engaged with the ball 12 in a conventional manner. The top member is then pivoted downwardly to a substantially horizontal position and the locking bar 44 connected with the top member by inserting the mandrels 46 into the apertures 48 to position the end portions of the mandrels under the shoulders 36 and in the bolt bores 35. The mandrels 46 must be fully inserted into the bolt bores 35 in order for the lock bolt apertures 60 to be aligned and receive the lock bolt 56 thus locking the top member 38 to the bolts 30. The spacing between the top member 38 and the upper limit of the trailer hitch socket 16 provides insufficient distance for removing the trailer hitch socket 16 from the ball 12 without unlocking the top member 38.

Referring now to FIGS. 4, 5 and 6, the locking device 70 similarly includes a right angular shaped support member or base 72 having a first or base flange 74 disposed on the tow bar 10 and receiving the trailer hitch ball 12. The other base flange 76 is similarly vertically disposed in spaced relation forwardly of the hitch ball 12. The respective ends of the vertical flange 76 are cut off to define upwardly converging surfaces terminating in a T-shaped configuration having a top bar 78 and a stem portion 80 characterized by oppositely disposed horizontal notches 82, for the purposes presently explained.

A pair of shafts or bolts 84 are similarly inserted through line drilled holes 86 formed in the base flange 74 and tow bar 10 and adjustably secured by nuts 88. The upper end portion of each of the bolts 84 are similarly provided with rearwardly facing recesses defining confronting horizontal shoulders 90 for the reasons presently explained.

A top plate-like member 92 is provided with a keyhole-like opening 94 adjacent its forwardly disposed edge 96 and medially its length, The circular portion of the opening loosely receives the T-shaped stem portion 80. The slot of the keyhold opening is for the purpose of receiving or passing one end of the T-shaped end 78 while the arcuate or circular surface portion passes the other end of the T-shaped end portion during joining and separating action of the top member 92 with the upright flange 76. The vertical dimension of the notches 82 is greater than the thickness of the top member by a selected demension thus permitting horizontal pivoting movement of the rearward edge portion of the top member toward and away from the base flange 74. Adjacent its rearward edge surface, the top member 92 is provided with a pair of apertures 100 cooperatively receiving the upper end portions of the bolts 84.

A locking bar 102, having a length substantially equal to the rearwardly disposed edge of the top member 92 and being U-shaped in transverse section, cooperatively receives the rearwardly disposed edge portion of the top member in a forward and rearward sliding action between legs 103 and 105 forming the U-shape. The legs of the locking bar 102 are provided with a pair of vertically aligned slots 104 and 106 open through the respective leg toward the upright flange 76 of the top member for transversely slidably receiving the upper end portions of the bolts 84. A portion of the lock bar forming the inner limit of the upper slot 104 enters the bolt recess between the shoulders 90 when the locking bar bight portion 108 contiguously contacts the rearward edge surface 98 of the top member. At one of its end portions, the top leg 103 of the locking bar is extended forwardly and vertically drilled, as at 110, in mating alignment with an opening similarly formed in the top member for receiving the lock bolt 56 of the lock 58 thus preventing vertical movement of the top plate 92 toward or away from the base flange 74. The length of the lock bar slots 104 and 106 is such that they prevent removal of the lock bar 102 from engagement with the bolts 84 by a horizontal pivoting action about the axis of the bolt hole 110. A spring 112, connected at its respective ends, with hooks or loops formed respectively on the rearward edge surface of the lock bar leg 103 and top of the T-shaped bar 78 maintains the lock bar snugly engaged within the bolt recesses.

In the operation of the embodiment shown by FIGS. 4, 5 and 6, the trailer hitch socket 16 is connected in a conventional manner with the bolt 12 when the lock 58, locking plate 102 and top member 92 are disconnected from the vertical flange 76. The top member 92 is connected with the vertical flange 76 by aligning the keyhole slot 94 for cooperative reception of the T-bar 78 therethrough and rotating the top member 92 90° for reception of the top end portions of the bolts 84 in the top member apertures 100. With the top member substantially horizontally disposed the locking bar 102 is slidably disposed over the rearward edge portion of the top member and laterally moved forwardly for engagement of the inner limit of the top leg slot 104 between the bolt shoulders 90 and aligning the lock bolt receiving holes 110. With the lock bolt 56 inserted through the holes 110 the trailer hitch socket 16 is secured against unauthorized removal by insufficient clearance between the top member 92 and trailer hitch socket 16 to permit its removal.

Obviously the invention is susceptible to changes or alterations without defeating its practicability. Therefore, we do not wise to be confined to the preferred embodiment shown in the drawings and described herein.

We claim:

1. In combination with trailer hitch components including a trailer hitch socket secured to a trailer hitch ball having its shank connected with a tow bar transversely secured to the rearward end of a towing vehicle, the improvement comprising:
   a base member having a generally flat portion overlying said tow
   bar and having an aperture in said flat portion surrounding
   an intermediate portion of the shank of said ball;
   a pair of upstanding bolts projecting above the upper limit of said hitch socket and disposed in spaced parallel relation on opposite sides of said ball longitudinally of said tow bar,
      said bolts each having a recess in its periphery forming a horizontal shoulder adjacent its upper end,
      said base member having a generally upright portion disposed forwardly of said ball;
   a top member overlying said base member and pivotally connected with said upright portion for vertical pivoting movement toward and away from said ball; and,
   a lockable bar means slidably supported by said top member for entering the recesses in said bolts and preventing movement of said top member relative to said bolts.

2. The combination according to claim 1 in which said top member is provided with a first pair of apertures for cooperatively surrounding an intermediate portion of said bolts adjacent the recess therein.

3. The combination according to claim 2 in which an edge portion of said top member opposite its pivotal connection is provided with a second pair of apertures formed on an axis normal to and communicating with the respective one of the first pair of apertures, and in which said bar means includes:
   a bar; and,
   a pair of mandrels secured to said bar for entering the second pair of apertures and the recesses in said bolts.

4. The combination according to claim 3 and further including:
   a fin secured to said bar; and,
   a lug secured to said top member adjacent said fin,
      said fin and said lug each having a cooperative lock bolt receiving aperture.

5. The combination according to claim 2 in which said bar means includes:
   a U-shaped bar having generally horizontally disposed legs respectively overlying and underlying that portion of said top member opposite its pivotal connection,
      at least one of the legs of said bar having cooperating slots transversely and slidably receiving said bolts adjacent the recesses,
      the edge surface forming the inner limit of each slot entering the respective bolt recess.

6. The combination according to claim 5 in which said bar
   and said top member are provided with cooperating lock bolt receiving apertures.

* * * * *